A. B. IBBOTSON & F. J. TALBOT.
Screw Bolt and Nut.

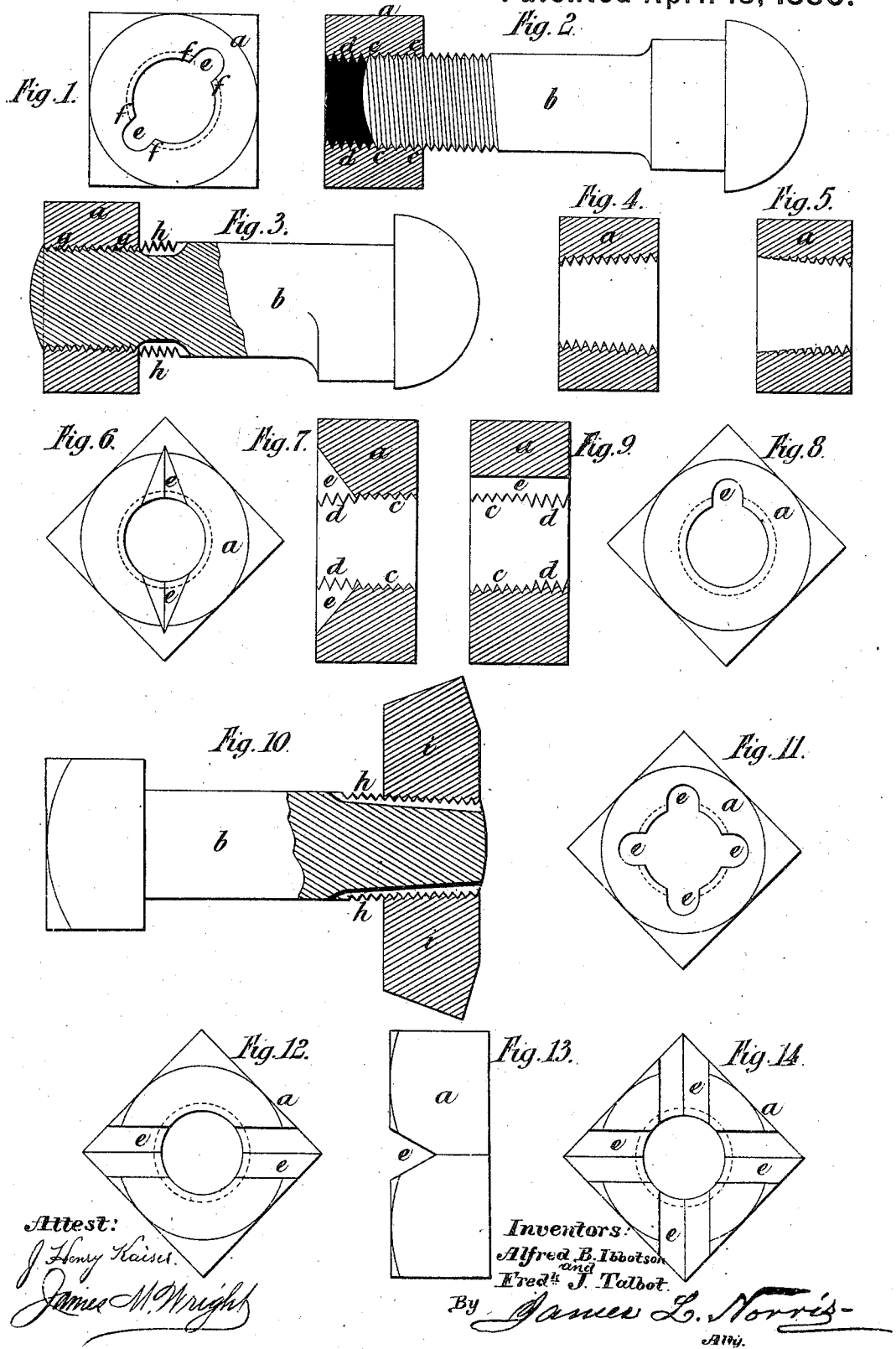

No. 226,450. Patented April 13, 1880.

Attest:
J. Henry Kaiser
James M. Wright

Inventors:
Alfred B. Ibbotson
and
Fredk J Talbot
By James L. Norris
Atty.

UNITED STATES PATENT OFFICE.

ALFRED B. IBBOTSON, OF FLORENCE, ITALY, AND FREDERICK J. TALBOT, OF SHEFFIELD, ENGLAND.

SCREW-BOLT AND NUT.

SPECIFICATION forming part of Letters Patent No. 226,450, dated April 13, 1880.

Application filed September 6, 1879. Patented in England June 11, 1879.

*To all whom it may concern:*

Be it known that we, ALFRED BUCKINGHAM IBBOTSON, of Florence, Italy, and FREDERICK JOHN TALBOT, of Sheffield, England, have invented new and useful Improvements in and relating to Screw-Bolts and their Nuts, of which the following is a specification, reference being had to the accompanying drawings.

The said invention relates partly to further improvements in the screw-fastenings described in the specification of Letters Patent dated June 12, 1877, No. 191,968. The said screw-fastenings consist of screws or bolts and nuts or tapped plates which have their screw-threads formed relatively in a peculiar manner, so that when first formed the male and female parts do not fit each other throughout their entire extent, and cannot be screwed together like ordinary screw-bolts and nuts, but have to be forced together, and when properly screwed together they lock each other so effectually that the accidental slackening or loosening of the bolt or nut is impossible, and thus the advantage of locking the said bolt or nut without any separate or special locking device is secured.

The main object of the said improvements is to carry into effect the principle or method of obtaining the secure and permanent retention of the nuts and bolts described in the said former specification with greater efficiency, convenience, and security, and with a reduction of the cost of formation of the screw-threads; and the present invention consists, chiefly, in so modifying the aforesaid principle or method that the peculiarly-formed threads in the one part may be used in combination with ordinary threads in the other part of the screw-fastening. We are thereby enabled to make use of ordinary iron screwed bolts or ordinary iron screwed nuts or bolt-holes in such a manner that without any special or separate locking device these fastenings may be rendered so permanently tight when screwed up that they will resist the loosening or slackening effect of any vibration to which they can be subjected.

These improvements comprise a screw-fastening consisting of a nut or tapped plate, (in which the screw-threads are cut in a peculiar manner,) in combination with an ordinary screw-bolt. In this case the screw-threads in the nut or bolt-hole are of hard or hardened metal, and instead of being made to fit the bolt in the usual manner, the nut or hole is so tapped that it is too small to be screwed for the full length of its screw-thread upon or to fully admit the said bolt without reducing the thread on the latter, and the desired result is effected by forcing the nut upon the bolt, or forcing the bolt into the hole; but according to this invention this result is not obtained (as described in the said former specification) by completing the partially-cut thread in the nut, but by reducing the thread on an ordinary screw-bolt—that is to say, when the hard-metal nut or plate tapped with a screw-threaded hole is used in combination with an iron screw or bolt whose screw-threads are of a somewhat larger diameter and of softer metal the hard threads of the nut or bolt-hole will act like a screw-plate to cut their way on and into the softer metal of the bolt, and the present invention is advantageous for the reason that it obviates the necessity for the extreme accuracy in the length of screwing which is required when specially-prepared bolts are used, as described in the said former specification.

The said improvements also comprise a screw-fastening consisting of a screw-bolt, (with peculiarly-cut threads,) in combination with a nut or plate tapped in the ordinary manner. In this case I form the bolt entirely or partially of hard or hardened metal, and with its threads, or some of them, of such a diameter that they cannot enter the nut or hole without acting like a screw-tap to cut their way into the softer screw-threads of the said nut or hole. Thus in both cases I cause the two kinds of threads to have such a close griping contact when screwed together as will effectually resist the loosening effect of vibration; and this object is accomplished in a more convenient and economical manner by the present invention than heretofore, for, according to the said former invention, both parts of the screw-fastening had to be specially formed—that is to say, it was necessary to use a completely-cut thread of hard metal on or in the one part, in combination with a thread of softer metal purposely left incomplete or only partially cut in or on the other part; but by this invention the special formation or preparation of the part which has the thread of soft metal is avoided and rendered unnecessary, for in cases where it is desired to use ordinary screwed iron bolts, particularly fish-bolts, which already exist and are in use in great quantities, it will only be necessary to replace the ordinary nuts with nuts made according to this invention, and thereby obtain the great advantages to be derived from its adoption at a trifling cost; or if (by reason of their much greater strength) steel bolts are preferred, such steel bolts may be made according to this invention, and may be used in connection with ordinary screwed iron nuts or bolt-holes; or we may use steel nuts, according to this invention, with specially-formed hard threads, in combination with ordinary screwed bolts that are made of steel which is softer than the cutting-threads of the nuts.

The said invention is illustrated in the accompanying drawings, in which—

Figure 1 is a plan, and Fig. 2 is a sectional side view, showing a nut with peculiarly-formed threads used in combination with an ordinary bolt. $a$ is the nut. $b$ is the bolt. $c\,c$ are threads in the nut of such a diameter as to fit the bolt in the ordinary manner. $d\,d$ are threads in the nut of smaller diameter, and which have to be forced upon the threads of the bolt, and when forced thereon will cut into and become fixed on the same. $e\,e$ are grooves or slots, which are formed entirely through the nut. $f\,f$ are the cutting-edges of the threads.

Fig. 3 is a sectional elevation of a bolt with peculiarly-formed threads applied to an ordinary iron nut. $a$ is the nut. $b$ is the bolt. $g\,g$ are threads on the bolt of such a diameter as to fit the threads in the nut in the ordinary manner. $h\,h$ are threads of a larger diameter, which will not enter the said nut without force, and which, when forced into the nut, cut into the threads in the same, and thereby secure the bolt tightly in the said nut. In this case the bolt is grooved longitudinally, or has breaks made in its threads, as shown in Fig. 19, so as to form cutting-edges for said threads.

Figs. 4 and 5 are longitudinal sections of nuts which have their threads smaller in diameter at one end than at the other end of the same, according to and for the purpose of this invention.

Fig. 6 is a plan, and Fig. 7 is a longitudinal section, of a nut with a peculiarly-formed thread, showing a modification of Fig. 1, the grooves or slots $e$ being formed only partially through the said nut.

Fig. 8 is a plan, and Fig. 9 is a longitudinal section, of a nut, showing another modification in the formation of the said grooves.

Fig. 10 is a sectional elevation illustrating a modification of Fig. 3, and showing one method of using a bolt which has a peculiarly-formed transversely-grooved thread, as herein described, with an ordinary tapped hole in a plate. $b$ is the bolt. $i$ is the plate. The hard threads at the part $h$ of the bolt are made too large in diameter to enter the threads in the hole of the plate without force, and to be screwed into the plate have to cut their way into the same, and when thus screwed into the said plate the bolt will be tightly secured therein. The bolt is tapering or conoidal, so that the cutting-edge of each of its thread-coils cuts into the bolt as it is screwed in.

Figure 15:
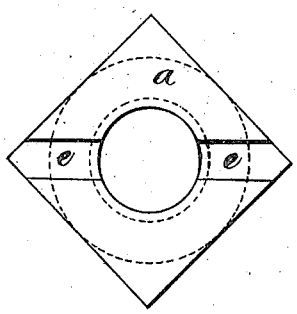
Figure 16:
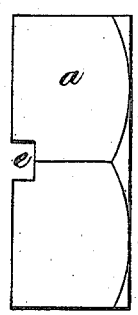
Figure 17:
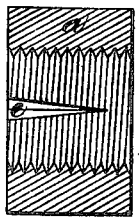
Figure 18:
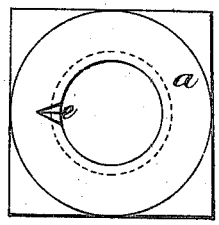

Figs. 11 to 18 illustrate modifications in the formation of the slots in the nuts—that is to say, Figs. 11 and 12 are plans. Fig. 13 is a side elevation of Fig. 12. Figs. 14 and 15 are plans. Fig. 16 is a side elevation of Fig. 15. Fig. 17 is a longitudinal section. Fig. 18 is a plan of Fig. 17.

Figure 19:
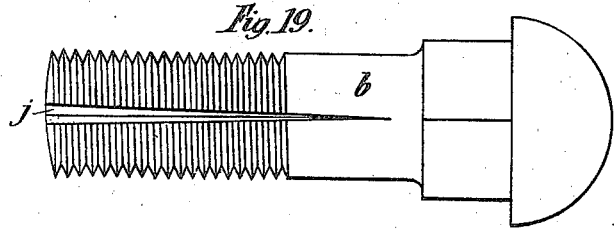

Fig. 19 is a side elevation of a bolt, showing a groove or slot at $j$. The bolts shown in Figs. 3 and 10 are similarly grooved or slotted.

Figure 20:
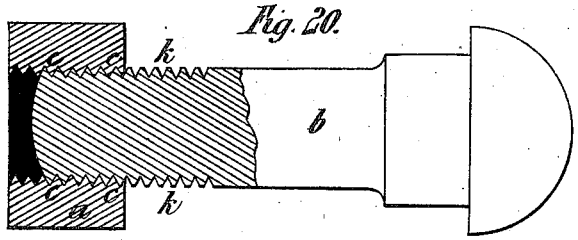

Fig. 20 is a sectional elevation, showing the application of a fully or completely tapped nut, $a$, to a partially-cut bolt, $b$. $c\,c$ are the fully-cut threads on the bolt. $k\,k$ are the incomplete or partially-cut threads on the bolt. These threads are so proportioned to each other that as the nut is forced on the bolt the hard threads of the nut will complete the cutting of the threads on the bolt, as hereinafter described.

Figure 21:
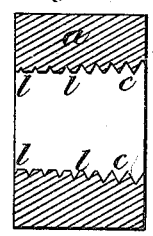

Fig. 21 is a longitudinal section of a nut having its threads $c\,c$ fully tapped or cut and its threads $l\,l$ only partially tapped or cut, so that the hard threads of a fully-screwed bolt may complete the cutting or tapping of the threads in the nut, as hereinafter described.

In carrying this invention into practice in connection with a peculiary-tapped nut, $a$, and an ordinary screwed iron or soft-steel bolt, $b$, as shown in Figs. 2, 7, and 9, the material composing the threads in the bolt-hole, or of which the nut is formed, should be steel, which may be in some instances hardened or tempered; or it should be iron, with the screw-thread's case or surface hardened, and the nut or hole is cut or tapped at one end with full threads, as shown at $c\,c$, of sufficiently large diameter to be screwed upon the bolt, and the remaining portion of the hole is tapped with screw-threads of a lesser diameter, as shown at $d\,d$. The parts $c\,c$ and $d\,d$, on which the threads are cut, are preferably nearly parallel; or the nuts or bolt-holes are so tapped that the threads in one end of the bolt-hole are large enough in diameter to pass freely on the screwed end of the bolt, but gradually diminish to the opposite end of the hole, as in Figs. 4 and 5; and after one of the said nuts has been screwed on the said ordinary screwed iron or soft-steel bolt for a certain distance to secure the pieces together, then, by the aid of a spanner or other suitable implement, the bolt may be forced forward into the bolt-hole, or the nut may be forced forward on the bolt, as far as required for firmly tightening up the articles to be compressed or secured by or between the same. It will then be found that during this process of forcibly screwing the pieces together the hard threads of the bolt-hole or of the nut which have the smaller diameter have actually cut their way, like a screw-plate, into the softer metal of the threads of the screwed iron bolt; or in cases where we use a steel bolt either unhardened or hardened or tempered, or an iron bolt with its threaded surface case or surface hardened, in connection with an ordinary iron bolt-hole or ordinary iron nut, then such steel or surface-hardened bolt may have a taper thread formed upon it with the smallest diameter of its thread (corresponding with the diameter of the thread in the bolt-hole or nut) at its end, as shown in Fig. 10; or those portions of the thread of the bolt which are of larger diameter, and that are to be forcibly screwed in the bolt-hole or nut to complete the tightening up, may be formed farthest from the end of the said bolt, and may be made parallel and of a larger diameter than the thread on its end, which may also be parallel, as shown in Fig. 3, so that in these cases, also, the forcing of the large portion of the bolt into the bolt-hole or the forcing of the ordinary nut forward on these threads of larger diameter on the bolt will have the effect of deepening the threads in the bolt-hole or nut.

In all of the above cases some portions of the male and female screw-threads will thus be brought into such absolutely close contact that they will adhere almost as closely and tightly as if welded together or formed of one solid piece of metal.

To facilitate the action of the hard portion of the female threads, (shown at d, Figs. 2, 7, 9,) or the large hard threads of the male screws, (shown at h, Fig. 3,) upon the soft threads, in which they are screwed, we form the grooves or slots e through the entire length of the hard threads of the nuts, as in Figs. 1, 8, 9, 11, or through those portions of them which are required to act as screw-plates, as shown in Figs. 6, 7, 12, 13, 14, 15, 16, 17, 18, or through the hard threads of the bolts, as shown at j, Fig. 19. The sharp edges formed on the threads where these grooves pass through them enable them to cut their way more easily than they otherwise would do and obviate the necessity for the exercise of force that would tend to strain or break the bolts. Moreover, they carry off any rust or grit which may have accumulated in the softer thread, as well as the metal they may cut from the same.

In some instances, instead of obtaining the desired result by a difference of diameter, we may effect it by a difference or an interruption of pitch of the threads of the bolt or in the nut or hole, the cutting-edges of the hard threads forming a corresponding thread in the soft part, as above explained.

Although we prefer that the screw-threads in the one part which have to be forced into or through the threads of the other part should be of steel or hardened metal, yet in some instances they may be of iron or of unhardened steel.

This invention is specially applicable for making secure and permanently-tight joints for railway-rails.

Having thus fully described our said invention and the manner of performing the same, we wish it understood that we do not claim a device consisting of the screw or bolt made entirely or partially of steel or hardened metal, and the nut or hole in which the threads are incompletely or imperfectly formed before the screw or bolt is placed in the nut or hole, and are completed by forcing the said bolt into them. Neither do we claim the device consisting of the screw or bolt and the nut or tapped hole, when the thread in the said nut or hole is formed of hard metal and is caused to complete the cutting of the thread on a specially-prepared bolt whose thread has been partially or imperfectly cut, as these devices are described in the said former specification, and necessitate the special formation or preparation of both parts of the screw-fastening; but

What we claim is—

A screw-fastening device which consists of two parts—namely, a screw or bolt and a nut or tapped plate—a portion of the screw-threads in one of said parts being normally of too small diameter, or otherwise unfit to engage with the threads of the other part, one of said parts being provided with cutting-edges formed by the groove cut across the threads, essentially as set forth.

ALFRED BUCKINGHAM IBBOTSON.
FREDERICK JOHN TALBOT.

Witnesses to the signature of Alfred Buckingham Ibbotson:
CHARLES WALKER,
13 Via della Vigna Nuova, Florence.
GIOVANNI BARTOLUCCI,
Servant in Mr. Ibbotson's house, Florence.

Witnesses to the signature of Frederick John Talbot:
AUGUSTUS FREDERICK STONE,
22 Barber Road, Sheffield.
ISAAC WIDDOP,
168 Grimesthorpe Road, Sheffield.